United States Patent [19]

Weismann

[11] 3,838,241

[45] Sept. 24, 1974

[54] MATRIX FABRICATION
[76] Inventor: Victor P. Weismann, 430 Prospect Cir., South Pasadena, Calif. 91030
[22] Filed: Mar. 22, 1972
[21] Appl. No.: 236,875

[52] U.S. Cl.............. 219/56, 140/112, 198/19, 219/58, 219/66, 219/80
[51] Int. Cl...... B23k 9/12, B23k 11/30, B21f 15/08
[58] Field of Search .... 219/56, 58, 79, 80, 117 HD, 219/66; 140/112; 198/19, 34, 110

[56] References Cited
UNITED STATES PATENTS

| | | | |
|---|---|---|---|
| 1,042,885 | 10/1912 | Budd et al.................. | 219/117 HD |
| 1,908,050 | 5/1933 | Reed.......................... | 219/56 X |
| 2,057,017 | 10/1936 | DeGanahl.................... | 219/66 X |
| 2,324,435 | 7/1943 | Smith.......................... | 219/117 HD |
| 2,365,181 | 12/1944 | Fentress...................... | 219/66 X |
| 2,596,453 | 5/1952 | Weidel........................ | 219/66 |
| 2,820,882 | 1/1958 | Johnson...................... | 219/117 HD |
| 3,565,238 | 2/1971 | Candela...................... | 198/110 |

FOREIGN PATENTS OR APPLICATIONS

| | | | |
|---|---|---|---|
| 235,663 | 9/1964 | Austria........................ | 219/56 |
| 615,263 | 7/1935 | Germany...................... | 140/112 |

Primary Examiner—J. V. Truhe
Assistant Examiner—Hugh D. Jaeger
Attorney, Agent, or Firm—Christie, Parker & Hale

[57] ABSTRACT

In the manufacture of a modular building panel having a three-dimensional welded wire matrix, the matrix is comprised of a plurality of essentially identical truss-like matrix subunits which are assembled in a machine which includes means for periodically adjusting for the adverse effects of tolerance accumulation so that the matrix subunits may be fabricated in an essentially continuous array in which each subunit has a length within predetermined tolerance limits. A plurality of strips of prefabricated truss units are introduced in synchronism into a matrix fabrication unit which is insensitive to the particular machine upon which matrix subunits were fabricated. In the matrix fabrication machine, a welding station is provided for each subunit of the matrix and includes coaxially aligned first and second electrodes movable toward and away from each other along their common axis, and a central electrode. The central electrode has a welding position in which the central electrode intersects the common axis of the adjacent first and second electrodes to serve as a conductive anvil for the first and second electrodes. The central electrode at each station also has a retracted position spaced from the common axis of the adjacent first and second electrodes to accommodate movement of material to be welded, including the aforesaid matrix subunits, into place between the first and second electrodes.

23 Claims, 19 Drawing Figures

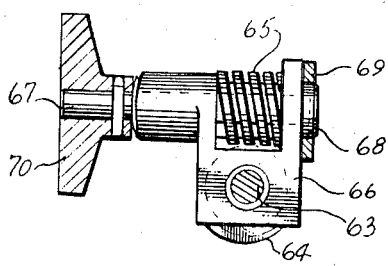
FIG_6
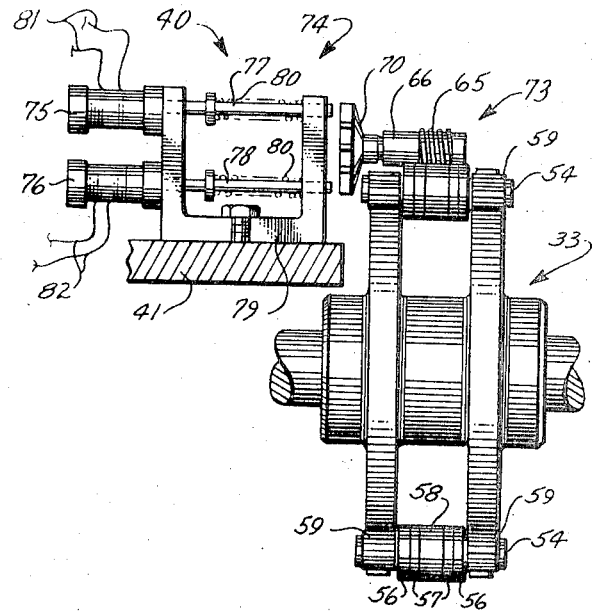
FIG_7
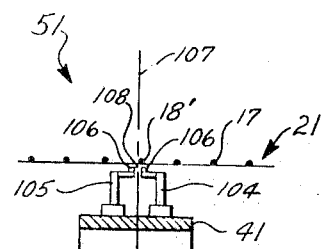
FIG_8
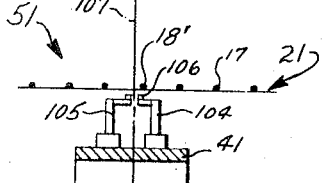
FIG_9
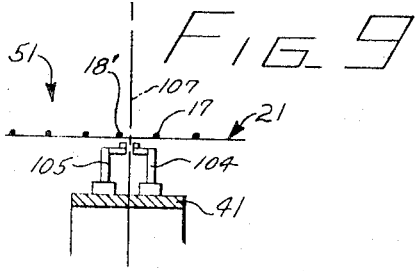
FIG_10
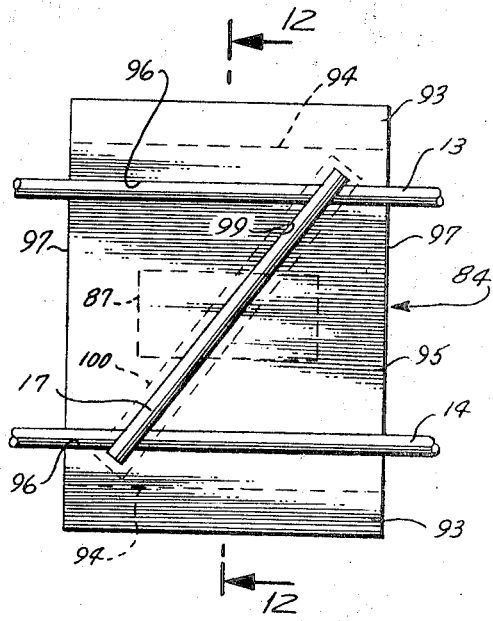
FIG_11

3,838,241

MATRIX FABRICATION

FIELD OF THE INVENTION

The invention pertains to procedures and apparatus for fabricating three-dimensional rectilinear welded wire matrices. More particularly, it pertains to procedures and apparatus for fabricating the welded wire matrices which constitute a major component of the prefabricated modular building panels described in my prior U.S. Pat. No. 3,305,991, for example.

BACKGROUND OF THE INVENTION

Review of the Prior Art

My prior U.S. Pat. No. 3,305,991 describes a reinforced modular foam building panel, and my prior U.S. Pat. No. 3,555,131 describes certain procedures and equipment for fabricating such panels. The panel is a composite of a three-dimensional welded wire matrix and of an insulative core defined within the matrix and bonded to strut members which traverse the interior of the matrix. Such panels have been approved for use by the International Conference of Building Officials, Pasadena, California, Report No. 2440, as structural and non-structural roof and wall panels for commercial and residential construction. These panels are characterized by their light weight, good thermal, moisture and acoustic insulative properties, their adaptability to efficient erection procedures, their compatibility with convention construction techniques, and their strength. The strength of these panels is obtained in part from the intimate bonding relation provided between the core of the panels and the strut members of the wire matrix.

So that these building panels may find widespread commercial acceptance, they must provide an economic alternative to conventional materials. Thus, these panels must be manufacturable at low cost, preferably by the use of automatic or semi-automatic equipment. To be certified as complying with various applicable building codes, it is necessary that these panels be uniform in their structural characteristics and dimensional aspects; dimensional uniformity from panel to panel is desired to secure optimum flexibility in the use of the panels.

Because these panels are provided in rather large sizes, they are difficult and costly to ship in quantity over any considerable distance. Therefore, it is desirable that the panels be fabricated at locations close to their areas of ultimate use. The geographical areas in which the present panels find particular utility are often remote from established centers of manufacture, and such areas are often poorly serviced by transportation facilities capable of transporting large quantities of such building panels on a regular or economic basis. It is desirable, therefore, that standardized matrix fabrication equipment be available for dispatch to a panel fabrication site proximate to the area in which the panels are to be used. Since the panel fabrication site may be in an area served by unskilled or semi-skilled labor, the matrix fabrication equipment should be essentially automatic and should be adjustable to produce panels of any length and width desired.

To achieve the desired dimensional uniformity, it may be desirable to fabricate the dimensionally sensitive matrix subunits in a centralized place of manufacture and to transport the matrix subunits in a compact and readily transportable form to a remote fabrication site for assembly into the completed matrix preparatory to formation of the appropriate insulative core within the matrix. When this procedure is followed, it is desirable that the matrix subunits be essentially identical so that the automatic matrix fabrication equipment may be insensitive to variations between the matrix subunits supplied to it.

Existing devices and procedures for fabricating welded wire assemblies are directed primarily to uniplanar or other simple welded wire structures and are totally inadequate to provide the three-dimensional rectilinear welded wire matrix of complex geometry and arrangement preferred for the panel described in my prior U.S. Pat. No. 3,305,991, for example; the geometry of the matrix described in that patent is particularly significant to the exceptional structural properties of the panel. It is apparent, therefore, that a need exists for automatic apparatus capable of rapidly and economically assembling matrix subunits of uniform dimensional characteristics, and that a need also exists for automatic equipment of a standardized nature operative to rapidly and efficiently produce completed welded wire matrices in whatever overall dimensions may be desired.

SUMMARY OF THE INVENTION

This invention fills the needs described above by providing improvements in apparatus and procedures for the fabrication of welded wire three-dimensional rectilinear matrices having strut members traversing the interior of the matrix between opposite major surfaces of the matrix. The present apparatus is essentially automatic, is of rugged construction, and is so arranged that it is relatively insensitive to precise adjustment to produce finished matrices of the desired dimensional uniformity.

Generally speaking, this invention provides improved welding apparatus for fabricating a welded wire three-dimensional rectilinear matrix of the type described above. The apparatus includes coaxially aligned first and second electrodes reciprocable toward and away from each other along their common axis. The apparatus also includes a central electrode which is mounted for movement between a welding position in which the central electrode intercepts the common axis of the first and second electrodes to serve as a conductive anvil for the first and second electrodes, and a retracted position in which the central electrode is spaced from the common axis of the first and second electrodes to accommodate movement of material to be welded into place across the common axis between the first and second electrodes.

DESCRIPTION OF THE DRAWINGS

The above-mentioned and other features of this invention are more fully set forth in the following description of certain presently preferred embodiments of the invention, which description is presented with reference to the accompanying drawings, wherein:

FIG. 6 is a cross-section view taken along line 6—6 in FIG. 4;

FIG. 7 is a fragmentary elevation view partly in cross-section of another portion of the fabrication equipment shown in FIG. 3;

FIGS. 8, 9 and 10 illustrate different states of tolerance accumulation sensing apparatus of the fabrication equipment shown in FIG. 3;

FIG. 11 is an enlarged view taken along lines 11—11 in FIG. 5;

DESCRIPTION OF THE ILLUSTRATED EMBODIMENTS

Figure 1:
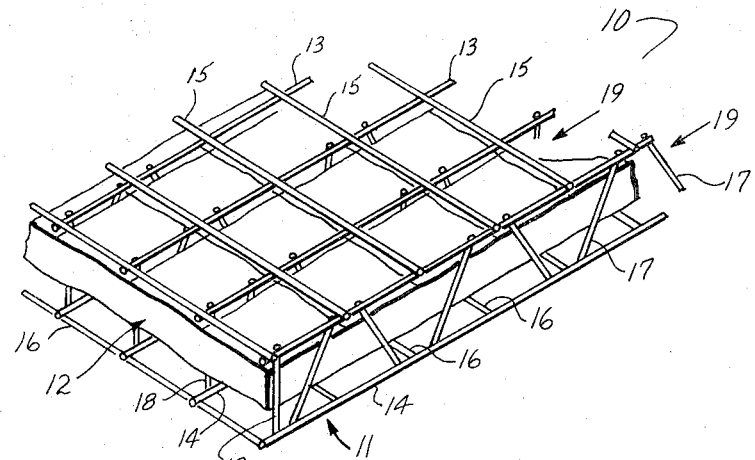
FIG. 1 is a perspective view of a portion of a panel produced by use of the procedures and apparatus of this invention.

As shown in FIG. 1, the principal components of a prefabricated modular building panel 10 are a matrix 11, and an insulative core 12 disposed within the matrix. The matrix is defined by a plurality of slender elongate rod-like wire elements. Conveniently, the matrix may be made up of elements defined by wire having a size of from 8 to 16 gauge AWG inclusive, and preferably the elements of the matrix are defined by 14 gauge wire. Preferably, the same size wire is used throughout matrix 11, but it is within the scope of this invention that the wires used to define one group of elements of the matrix may be of a different size within the preferred range mentioned above from the elements defining the remainder or different groups of elements within the matrix.

The matrix includes a plurality of spaced parallel upper longitudinal elements 13 which are conveniently referred to as upper truss runners. A corresponding plurality of spaced lower longitudinal elements 14 define lower truss runners. The upper truss runners 13 are interconnected by a plurality of spaced parallel transverse members 15, and the lower truss runners are interconnected by a corresponding plurality of transverse members 16. In the finished matrix, the upper turss runners and their corresponding transverse members define an upper major surface of matrix 11. Similarly, the lower truss runners and their transverse members define a lower major surface of the matrix. Preferably, the upper and lower major surfaces of the matrix are parallel to each other and are flat. The major surfaces of the matrix are interconnected by a plurality of truss strut members 17 which traverse the interior of the matrix between corresponding pairs of upper and lower truss runners 13 and 14, and by close-out members 18 at opposite ends of the matrix between corresponding pairs of the upper and lower truss runners.

As shown in FIG. 1, a longitudinal element 13 is provided for each longitudinal element 14. Each combination of a pair of upper and lower longitudinal elements 13 and 14, and of the strut and close-out members 17 and 18 interconnected therebetween, define a truss section 19. In matrix 11, several truss sections are spaced parallel to each other across the width of the matrix and are interconnected by transverse members 15 and 16 in the upper and lower major surfaces of the panel. The height of each truss section, i.e., the spacing between aligned pairs of upper and lower truss runners 13 and 14, defines the thickness of the complete matrix. The matrix has opposite ends and side surfaces disposed perpendicular to each other and to the matrix major surfaces.

As shown in FIG. 1, transverse elements 15 and 16 in the upper and lower major surfaces of the matrix are disposed perpendicular to the adjacent longitudinal elements 13 and 14 in the corresponding major surfaces of the matrix. The interconnecting elements 18 at opposite ends of each truss section 19 are perpendicular to the transverse and longitudinal elements in the opposite major surfaces of the matrix.

The strut members interconnected between the upper and lower truss runners in each truss section are disposed at spaced locations along the length of the truss section. The strut members are disposed at an angle of about 45° relative to the truss runners, and alternate ones of these strut members, proceeding along the length of each truss section, are disposed oppositely to each other. That is, strut members 17 in each truss section are disposed in alternate conveying and diverging relationship to each other along the length of the truss section such that one strut member may slope at an angle of about 45° from left to right proceeding upwardly from lower truss runner 14 to upper truss runner 13, and the next strut member along the truss section to the right may slope from left to right proceeding downwardly from the upper truss runner to the lower truss runner, and so on throughout the length of the truss section. At any given position along the length of the entire matrix, it is preferred that the strut members of the several truss sections be disposed parallel to each other, although it is not essential that this relationship be present in the finished matrix.

In a presently preferred matrix, elements 13, 14, 15 and 16 are spaced apart from each other on 2 inch centers within their respective groups. Also, it is preferred that the aligned upper and lower truss runners 13 and 14 be spaced apart on 2 inch centers. Thus, matrix 11 is organized on a 2 inch cubical module and conveniently is fabricated in 4 foot widths in lengths of from 8 to 14 feet, the length of the panel within this range varying in 2 inch increments. It will be appreciated, however, that different spacing of the elements of matrix 11 may be used as desired, and that the matrix may be fabricated of different nominal width or length, all without departing from the scope of this invention.

The insulative core 12 of panel 10 preferably is defined by a unitary mass of unicellular synthetic foam material such as polyurethane foam. The core preferably is disposed wholly within the matrix to extend from side to side and end to end of the matrix in spaced relation to the opposite major surfaces of the matrix. The thermally insulative material defining core 12 is bonded within the matrix to the strut members which traverse the interior of the matrix, thereby to give lateral support to the strut members and increase the strength of the strut members considered as columns. Where the insulative core is defined by polyurethane foam or the like, the bonding of the core to strut members 17 is assured by foaming the core material in situ within the matrix and allowing the foam material to bond to the strut members as the synthetic foam material sets to a rigid or semi-rigid state. If desired, however, core 12 may be defined by a plurality of strips of prefoamed unicellular material, such as polystyrene foam, inserted into desired positions within the matrix and secured to the strut members by a suitable bonding agent such as a latex-based bonding agent, or a layer of polyurethane foam foamed in situ within the matrix over the inserted insulative elements and hard set within thee matrix to securely position the inserted insulative elements within the matrix. My prior U.S. Pat. No. 3,555,131 describes procedures and equipment which may be used to provide the preferred foamed in situ polyurethane insulative core of panel 10.

Figure 2:
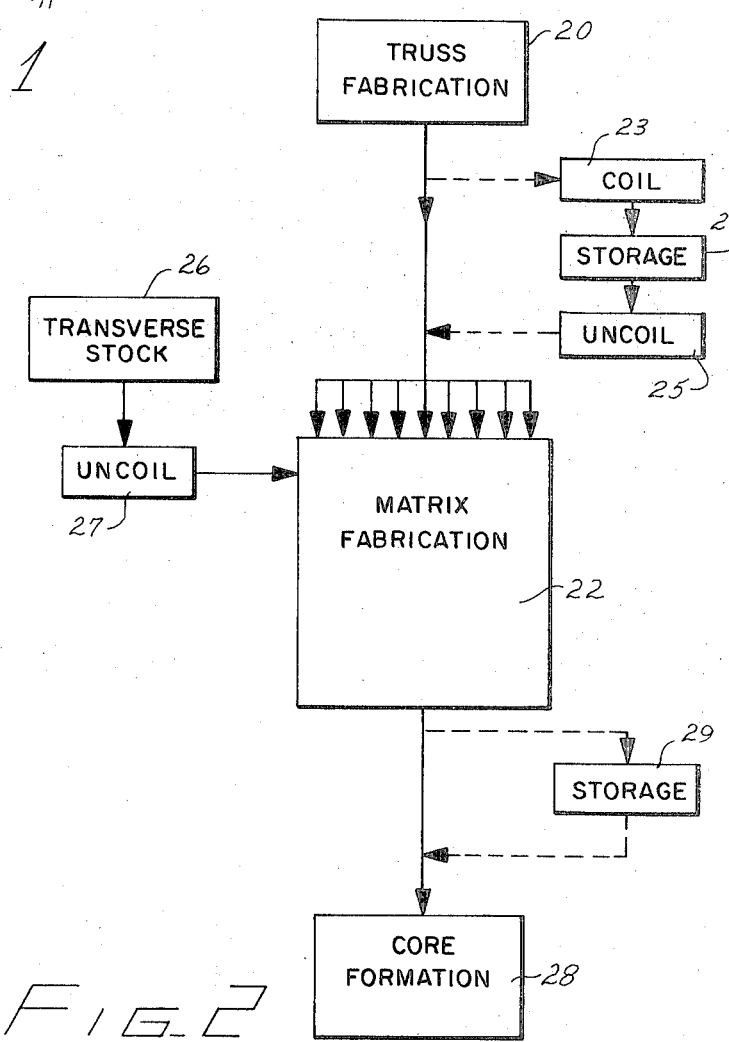
FIG. 2 is a schematic diagram of the basic operations involved in the fabrication of the panel shown in FIG. 1.

FIG. 2 illustrates the overall manufacturing process of panel 10. This process may be carried out at a single location, or it may be subdivided to be performed at several locations in which the product produced by one operation is processed in succeeding operations at a different location, as desired. Thus, the manufacturing process contemplated by this invention involves the fabrication of truss sections 19 at a truss fabrication station 20 wherein the truss sections are fabricated as a continuous strip 21 (see FIG. 14, for example) of serially connected truss sections. The strip of truss sections may pass either directly from the truss fabrication station 20 to a matrix fabrication station 22 at the same site as the truss fabrication station, or the strip may be passed from the truss fabrication station to a coiling station 23. From the coiling station, coils of truss section may be transported to a storage location 24 either at the site of the truss fabrication station or at the site of the matrix fabrication station 22. From the storage location 24, coils of truss section are passed to an uncoiling station 25 associated with matrix fabrication station 22. Also, at the matrix fabrication station, a quantity of stock material for transverse elements 15 and 16 of matrix 11 is provided at a transverse stock supply station 26 from which the material for the matrix transverse elements is passed to an uncoiling station 27 and thence to the matrix fabrication station. From the matrix fabrication station, the completed matrix may be passed directly to a core formation station 28 at the same site as the matrix fabrication station. On the other hand, the finished matrix may be held in a storage location 29 associated with either the matrix fabrication station or the core formation station, as desired, and from which completed matrices are withdrawn as desired.

Figure 3:
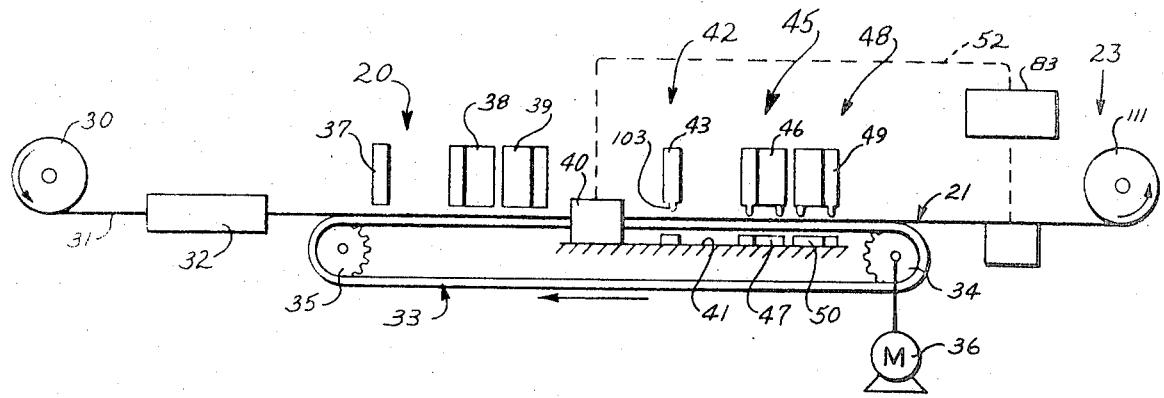
FIG. 3 is a simplified elevation view of the fabrication equipment fo the truss units of the panel shown in FIG. 1.

At truss fabrication station 20, as shown in FIG. 3, a pair of coils 30, only one of which is shown, of stock wire 31 for truss runners 13 and 14 are disposed to supply truss runner stock wire to an uncoiling and straightening station 32 from which parallel lengths of straightened truss runner wire is supplied to the upper portion of a conveyor belt 33 engaged between a drive pulley 34 and an idler pulley 35. Preferably the idler pulley is disposed adjacent wire straightening station 32, whereas drive pulley 34 is disposed adjacent a truss section coiling station 23. Drive pulley 34 is driven by a suitable motor 36 so that the upper portion of the loop of conveyor belt 33 between pulleys 34 and 35 is driven toward coiling station 23. As a given point on conveyor belt 33 moves from idler pulley 35 toward drive pulley 34, it passes, in sequence, the following components of truss fabrication station 20; a dispenser station 37 for dispensing precut close-out members 18 to the belt, a dispenser station 38 for dispensing precut strut members 17 to the belt (dispenser station 38 is provided for dispensing those of strut members 17 which are inclined in one direction relative to truss runners 13 and 14), a dispensing station 39 for dispensing precut strut members corresponding to those strut members of the truss section which are inclined in the opposite direction to the truss runners from the strut members dispensed at station 38, a belt length adjusting station 40 disposed on a foundation 41, through a close-out member welding station 42 comprised of a welding assembly 43 above belt 33 and a back-up assembly 44 below the belt on foundation 41, through a first strut member welding station 45 comprised of a welding assembly 46 above the belt and a back-up assembly 47 below the belt on foundation 41, and then through a second strut member welding station 48 comprised of a welding assembly 49 and a back-up assembly 50 similar to the corresponding elements of first strut member welding station 45. As the belt passes out of second strut member welding station 48, the strip 21 of truss sections is complete. Strip 21 is passed from belt 33 to coiling station 23 past a tolerance cumulation scanning station 51 which is operatively connected (as represented by dashed line 52 in FIG. 3) to belt length adjustment station 40.

FIGS. 4, 5, 6 and 7 show conveyor belt 33 which is of the chain type. Specifically, conveyor belt 33 resembles a conventional bicycle chain having a plurality of regularly spaced axle pins including two end axle pin assemblies 53 and a plurality of intermediate axle pins 54 disposed at regularly spaced locations along the belt. The end axle pin assemblies are disposed at opposite ends 55 of the belt. Adjacent axle pins along the length of the belt are interconnected by a pair of link members, the link members being comprised of outer link members 56 and inner link members 57. In the case of each intermediate axle pin 54, the axle pin is journalled at about its midpoint by a spacer bushing 58 and by the adjacent ends of each of a pair of outer link members 56 and a pair of inner link members 57. The axle pin projects outwardly on either side of outer link members 56 where it carries a bearing bushing 58. Preferably drive pulley 34 and idler pulley 35 are defined as a pair of circumferentially toothed sprocket wheels (see FIG. 7) spaced coaxially apart from each other a distance corresponding to the spacing of bearing bushings 59 along each intermediate axle pin 54. The sprocket wheels of each of pulleys 34 and 35 engage bearing bushings 59. Alternate adjacent pairs of axle pins in conveyor belt 33 are interconnected by outer link members 56 and the remaining adjacent pairs of axle pins are interconnected by inner link members 57. All link members are rotatable about the axle pins with which they are engaged. Intermediate axle pins 54 extend continuously across the width of belt 33.

Figure 4:
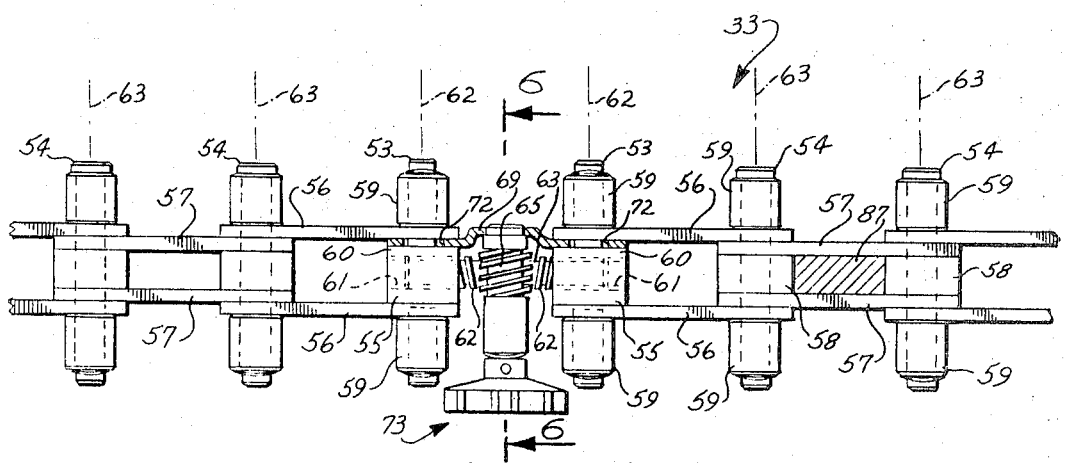
FIG. 4 is a top plan view of a portion of the conveyor belt illustrated in the installation shown in FIG. 3.

As shown best in FIG. 4, end axle pin assemblies 53 are provided as a pair of stub axle pins which extend coaxially in opposite directions from a central block 60. Each block 60 has an internally threaded hole 61 formed through it normal to the common axis 62 of the stub axle pins; each intermediate axle pin 54 has an axis 63. Each hole 61 defines internal threads which are opposite in handedness to the threads in the hole formed in the block 60 at the other end of belt 33, and these threads cooperate with oppositely handed external threads 62 formed at the opposite ends of a screw shaft 63 engaged between blocks 60 to interconnect the opposite ends 55 of belt 33 to form a continuous belt loop. Shaft 63 also defines a pinion gear 64 (see FIG. 5) between threads 62 for cooperation with a worm 65 rotatably mounted in a support block 66 which also journals shaft 63 on either side of gear 64. Worm 65 is carried on a shaft 67 which extends through support block 66. One end of shaft 67 is rotatably engaged within a hole 68 formed in a positioning link 69. An operating wheel 70, defining a plurality of radial spur teeth 71, is affixed to the opposite end of worm shaft 67, as shown best in FIG. 6. Positioning link 69 is provided between belt end axle pin assemblies 53 for maintaining worm shaft 67 in a desired position relative to the adjacent belt end axle pins, as shown best in FIG. 5. The opposite ends of positioning link 69 define aligned slot apertures 72 through which the stub axle pins are passed, as shown in FIG. 4. The opposite ends of positioning link 69 are disposed between the corresponding block 60 and the adjacent end of the corresponding outer link 56.

Figure 5:
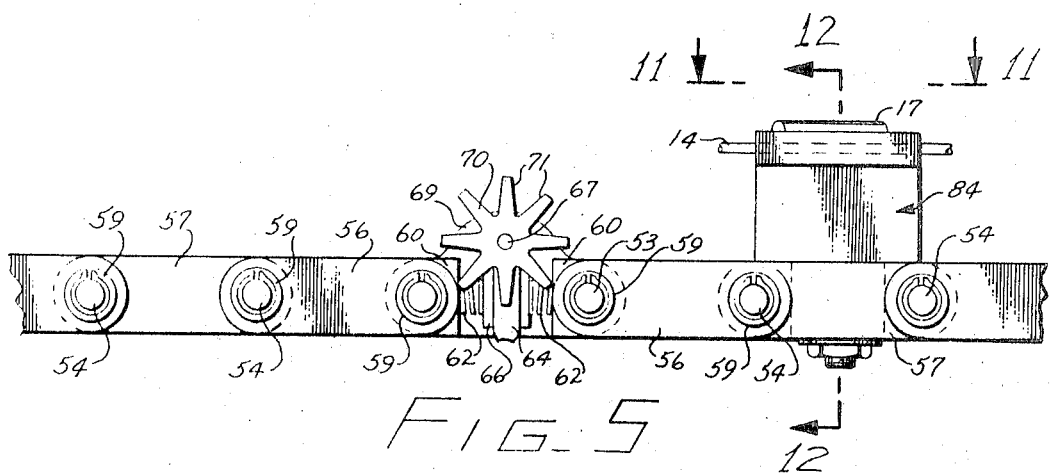
FIG. 5 is a side elevation view of the portion of the conveyor belt shown in FIG. 4.

An examination of FIGS. 4, 5 and 6 will show that screw shaft 63, worm 65, support block 66 and positioning link 69 constitute a variable length interconnection mechanism 73 between blocks 60 such that the distance along belt 33 between axle axes 62 is adjustable in response to rotation of wheel 70 to rotate worm 65. The slot apertures 72 formed in positioning link 69 accommodate linear movement of axle pin assemblies 53 toward and away from each other to vary the effective length of belt 33.

Variable length connection mechanism 73 cooperates with an actuating mechanism 74 located at belt length adjustment station 40. The actuating mechanism includes a pair of solenoids 75 and 76 having reciprocable armatures 77 and 78, respectively. The solenoids are disposed parallel to each other and their armatures are supported in a guide 79 secured to foundation 41. Solenoid armatures 77 and 78 are disposed to cooperate with the upper and lower portions of operating wheel 70 as the wheel passes belt length adjustment station 40 in response to operation of drive pulley 34. Each solenoid armature is biased away from cooperation with wheel 70 by a spring 80 cooperating between guide 79 and the armature. Solenoids 75 and 76 are disposed such that when either solenoid is energized, the armature thereof is extended, from the unenergized position thereof shown in FIG. 7, toward the path of movement of belt 33 sufficiently to move into interfering relationship with the spur teeth 71 defined by wheel 70. Thus, engagement of solenoid armature 77 with wheel 70 causes the upper portion of the wheel to tend to remain stationary momentarily relative to foundation 41 as belt 33 is driven past the actuating mechanism, thereby turning worm 65 in a direction productive of movement of blocks 60 toward each other. Conversely, cooperation between solenoid armature 78 and the lower portion of wheel 70 produces rotation of worm 65 in a direction productive of increased distance between blocks 60. Such rotation of wheel 70 occurs only momentarily as the wheel is moved past actuating mechanism 74, and thus a single instance of cooperation of actuating mechanism 74 with variable link connection mechanism 73 produces a predetermined small change in the effective length of conveyor belt 33.

Energization current for solenoids 75 and 76 is provided to the solenoids via conductors 81 and 82, respectively, which conductors constitute a portion of connection 52 between belt length adjustment station 40 and tolerance cumulation scanning station 51. Connection 52 includes a control circuit 83 which receives signals from scanning station 51 and controls the energization of conductors 81 and 82 dependent upon the nature of the signal received by the control circuit from scanning station 51.

Figure 12:
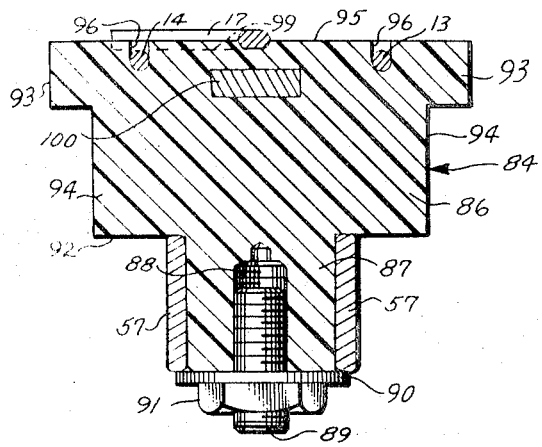
FIG. 12 is a cross-section view taken along lines 12—12 in FIGS. 5 and 11.

A plurality of carrier blocks are carried by conveyor belt 33. The carrier blocks include a plurality of intermediate carrier blocks 84 disposed one between each adjacent pair of intermediate axle pins 54, and a pair of end carrier blocks 85 connected to the belt between each end axle pin assembly 53 and the adjacent intermediate axle pin 54. This is shown best in FIG. 14. All intermediate carrier blocks 84 are substantially identical to each other and end carrier blocks 85 are identical to each other. As shown best in FIG. 12, each carrier block 84 is fabricated of electrically non-conductive, dimensionally stable material, and has a body 86 which is of generally cubical configuration. A projection 87 of rectangular cross-section extends downwardly from the central portion of body 86 and is sized to fit snugly between spacer bushings 58 and the link members associated with each adjacent pair of intermediate axle pins 54. Thus, half of the plurality of intermediate carrier blocks have projections 87 sized to fit in the opening defined between inner link members 57, as shown in FIG. 4, and the remaining intermediate carrier blocks have projections 87 sized to fit in the space bounded by a pair of outer link members 56. The length of each projection 87 is slightly less than the height of link members 56 and 57. A downwardly open, internally threaded hole 88 is formed centrally of each projection to accommodate an externally threaded stud 89 to facilitate connection of the carrier block to conveyor belt 83 by means of a washer 90 and a nut 91, as shown in FIG. 12. Washer 90 has a diameter sufficient to engage the lower edges of the pertinent link members between which projection 87 is disposed when the carrier block is connected to belt 33. Each block 84 also defines a side flange 93 which extends laterally from opposite side surfaces 94 of body 86. The upper surface of each flange is coplanar with a top surface 95 of body 86. The distance between the underside of each side flange 93 and block bottom surface 92 is greater than the distance of the top of wheel 70 above the top of conveyor belt 33 as defined by link members 56 and 57, as shown in FIG. 5.

A pair of parallel grooves 96 are formed in the top surface of each intermediate carrier block 84 and of each end carrier block 85. The centers of grooves 96 are spaced apart by a distance which is equal to the distance between the centers of truss runners 13 and 14 in truss section strip 21. Each groove has a depth from block top surface 95 which is equal to the diameter of the wire used to define truss runners 13 and 14, plus about one-half of the diameter of the wire used to define strut members 17 and close-out members 18. Grooves 96 are disposed between the side surfaces 94 of each carrier block. Each of grooves 96 extends across the entire length of the carrier block between opposite end surfaces 97 of the block; the end surfaces of end carrier blocks 85 are designated 98 for the purposes of distinction between the intermediate and end carrier blocks. Grooves 96 in all carrier blocks disposed across the top of conveyor belt loop 33 between pulleys 34 and 35 are aligned with each other, and wire uncoiling and straightening stations 32 are aligned with the grooves to feed parallel strands of wire 31 from coils 30 into grooves 96.

Each carrier block 84 further defines a groove 99 across its top surface 95 at an angle to grooves 96; the angle corresponds to the angle of inclination of strut member 17 to truss runners 13 and 14. Each groove 99 has a length somewhat greater than the length of each strut member 17 and is sufficiently deep that when truss runners 13 and 14 are disposed in their respective grooves 96, the upper portions of the truss runners traverse the lower portions of grooves 99 inside the opposite ends of grooves 99. Grooves 99 are provided for receiving and properly positioning precut wire lengths used to define strut members 17.

Each intermediate carrier block 84 also includes an electrically conductive bus member 100 embedded within the electrically non-conductive body of the carrier block. The bus member is disposed in alignment with groove 99 and is spaced below block top surface 95 so that the bottom portions of grooves 96 are coplanar with the upper surface of the bus member at the opposite ends of the bus member. Thus, when truss runners 13 and 14 are disposed in grooves 96, each truss runner conductively engages bus member 100 below the location where strut member grooves 99 cross the truss runner grooves.

Each groove 99 has a depth which is less than the diameter of the wire used to define strut members 17. Thus, when a precut strut member element is disposed in groove 99, the upper surface of the element lies above block top surface 95. Intermediate carrier blocks 84 are connected to conveyor belt 33 so that grooves 99 in adjacent carrier blocks converge and diverge from each other in the manner described above concerning the disposition of strut member 17 in each truss section 19.

If desired, the distance between end surfaces 97 of each intermediate carrier block 84 may be equal to or less than, but not greater than, the distance between the axes 63 of adjacent intermediate axle pins of conveyor belt 33. Where the spacing between block end surfaces 97 equals the spacing between axes 63, the end surfaces of adjacent carrier blocks intimately engage each other along the upper portion of the belt loop to impart to the belt between the pulleys some measure of resistance to deflection in response to loads applied downwardly to the belt. If desired, such cooperation between the end surfaces of adjacent carrier blocks may be relied upon to provide all back-up force required in association with the operation of welding assemblies 43, 46 and 49 as strut members 17 and closeout members 18 are welded to truss runners 13 and 14. Preferably, however, back-up assemblies 44, 47 and 50 are provided to cooperate with the bottom surfaces of side flanges 93 to provide the back-up force associated with the operation of welding assemblies 43, 46 and 49.

Figure 13:
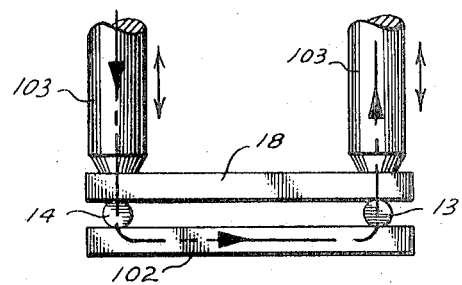
FIG. 13 is a simplified elevation view of the structure defining a conductive path between the welding electrodes at each welding station in the apparatus shown in FIG. 3.

Each end carrier block 85 incorporates all of the features described above concerning intermediate carrier blocks 84. From an examination of FIG. 4, it will be apparent that the crosssectional dimensions of the lower projection 87 of each end carrier block are defined with reference to the opening between outer link members 56, block 60 and spacer bushing 58 at each end 55 of belt 33. Also, the distance between the end surfaces 98 of each end carrier block is on the order of 140 percent greater than the distance between adjacent intermediate axle pin axes 63. Each end carrier block 85 defines a pair of parallel grooves 96, a groove 99 for receipt of a strut member 17, and a bus member 100 below and parallel to the strut member receiving groove. Further, each end carrier block defines a transverse groove 101 in its top surface aligned perpendicular to truss runner grooves 96 and of about the same depth as the adjacent strut member receiving groove 99. Grooves 101 are provided for receiving and properly positioning precut close-out member 18. A conductive bus member 102 (see FIG. 13) is provided below and parallel to each close-out member receiving groove 101 to be engaged adjacent its opposite ends by the corresponding truss runner 13 or 14. Bus members 100 and 102 in the end carrier blocks are separated from each other by the non-conductive material of the carrier block.

Figure 14:
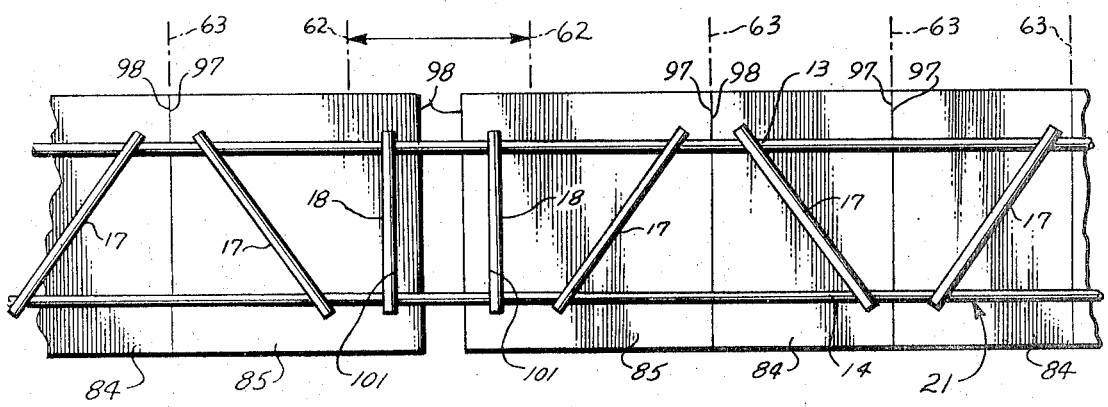
FIG. 14 is a simplified top plan view of a portion of the apparatus shown in FIG. 3 illustrating a strip of truss sections at the location between adjacent truss sections in the strip as supported on the conveyor shown in FIG. 3.

As shown best in FIGS. 11 and 14, the opposite ends of each strut member receiving groove 99 are disposed inwardly of carrier block 84 from the opposite end surfaces 97 of the carrier block. The same situation exists with the ends of the strut member receiving grooves in the end carrier blocks relative to the adjacent end surfaces 98. This position of the strut member receiving grooves in the several carrier blocks on belt 33 results in the proximate ends of adjacent strut members in each truss section 19 being spaced from each other by a predetermined distance along truss runners 13 and 14. In the presently preferred matrix 11 organized on a 2 inch cubical module, the spacing along each truss runner between the converging ends of adjacent strut members is approximately 1 inch. This spacing is desired in order to provide the necessary clearance and desired tolerance between the adjacent ends of the strut members to permit engagement of the electrodes in matrix fabrication station 22 with truss runners 13 and 14.

The distance between end surfaces 98 of the end carrier blocks is defined at an amount less than 1½ times the distance between adjacent axes 63 to accommodate movement of the end carrier blocks toward and away from each other in response to the operation of variable length connection mechanism 73.

The effective length of conveyor belt 33 is equal to the effective length of one truss unit section 19, plus an additional amount determined by the width of cut made by a matrix cutting assembly 150 provided in matrix fabrication apparatus 115 described below. Thus, if matrix 11 is to be provided with an effective length of 10 feet, then the effective length of conveyor belt 33 is slightly greater than 10 feet.

From the foregoing description, it will be apparent that, by the nature of conveyor belt 33 and of the carrier blocks carried by it, strip 21 of serially connected interconnected truss units 19 may be fabricated rapidly and essentially automatically at truss fabrication station 20. As the belt is driven through the truss fabrication station, dispensing station 37 is effective to dispense precut lengths of suitable wire stock into close-out member receiving and positioning grooves 101, and dispensing stations 38 and 39 are effective to dispense suitably precut lengths of wire into strut member receiving and positioning grooves 99. As the strut members and close-out members are dispensed onto belt 33, they make contact adjacent their ends with the upper portions of truss runners 13 and 14, which have previously been positioned within their receiving grooves 96 by operation of uncoiling and straightening stations 32. As a dispensed close-out member passes weld station 42, welding assembly 43 is operated to drive a pair of electrodes 103 into contact with the opposite ends of the close-out member, thereby to establish a conductive path between the electrodes through the close-out member, truss runners and bus member 102. During such contact a pulse of welding current (represented by arrow 104 in FIG. 13) is passed between the electrodes to resistance weld close-out member 18 at its opposite ends to truss runners 13 and 14, respectively; thereafter, electrodes 103 are withdrawn from the close-out member.

Similarly, as strut members 17 pass strut member welding stations 45 and 48, a pair of welding electrodes (similar to electrodes 103) at each station are brought into contact with the opposite ends of the dispensed strut members to establish a conductive path between the electrodes via bus members 100. Welding station 45 is provided for welding to the truss runners those strut members which, when conveyor belt 33 is viewed from the top, slope from left to right between truss runners 14 and 13. Conversely, welding station 48 is provided for welding to the truss runners those strut members which slope from right to left proceeding from truss runners 13 to truss runner 14. The appropriate periods at which welding assemblies 43, 46 and 49 are operated to weld the close-out and strut members to the truss runners are controlled by conventional equipment which does not itself form a pair of this invention. If desired, the controlling equipment for the welding assemblies may be regulated by suitable stops, pins or the like carried by the corresponding carrier blocks and the operation of dispensing stations 37, 38 and 39 may be regulated in the same manner by the same or a different set of stop pins or the like.

For most efficient operation of truss fabrication station 20, it is desired that conveyor belt 33 be driven continuously. Accordingly, welding assemblies 43, 46 and 49 are mounted for limited movement relative to foundation 41 along the path of belt 33 so that the electrodes of these welding assemblies may be stationary relative to the belt during those intervals when the electrodes are in physical contact with the closeout and strut members, respectively.

An examination of FIG. 1 will show that each matrix 11 requires a plurality of truss sections 19. Where matrix 11 is defined on the 2 inch cubical module defined above and has a width of 4 feet, it is apparent that twenty-five truss sections 19 are provided in each matrix. Thus, if operation of matrix fabrication station 22 produces matrix 11 at the rate of 1 foot per minute, it is necessary that truss sections 19 must be fabricated at the rate of 25 feet per minute. As a practical matter, plural truss fabrication stations are preferred to supply sufficient truss section strip material to a matrix fabrication station operated at maximum rate. As will become apparent from the following description of matrix fabrication station 22, it is important that the matrix fabrication station not care whether the strips of truss section fed to it originate from one or more truss fabrication stations. Since, as a practical matter, plural truss fabrication stations are used, and since precise dimensional identity between plural truss fabrication stations is virtually impossible to achieve, the belt length adjustment station 40 provided in each truss fabrication station assures that the truss sections 19 produced at each of a plurality of truss fabrication stations are of uniform length within small predetermined limits of permissible length variation. The factors which, but for the presence of belt length adjusting mechanisms 40 at each truss fabrication station, could lead to variations in the effective length of truss sections 19 include the temperature of the environment at each truss fabrication station at the time of manufacture of any given truss section, differences in wear between different truss fabrication stations, and differences in tolerance in dimension, position and the like between corresponding components of different truss fabrication stations.

As noted above, the belt length adjusting mechanism at each truss fabrication station is operated in response to suitable control signals supplied by control circuit 83 which receives tolerance cumulation signals from a tolerance cumulation scanning station 51 disposed between conveyor belt 33 and coiling station 23. As shown best in FIGS. 8, 9 and 10, scanning station 51 includes a pair of position sensors 104 and 105 which cooperate with selected elements of strip 21, preferably close-out members 18. Each position sensor 104 and 105 includes a scanning device 106 sensitive to the position of a close-out member 18' relative to the center plane 107 of a space 108 provided between the sensing heads. The width of space 108 is defined with reference to the permissible range by which the length of a predetermined number of serially connected truss sections 19 within strip 21 may vary. Scanning devices 106 may be of the magnetic type or optical type, or any other type suitable, dependent upon the degree of control to be exercised over the amount of dimensional tolerance which can be cumulated in the length of the predetermined number of truss sections before a correction is made in the effective length of belt 33 by operation of variable length connection mechanism 73. Preferably, scanning devices 106 are disposed below strip 21 between conveyor belt 33 and coiling station 23 and are connected by suitable conductors (not shown) to control circuit 83.

FIG. 8 shows a close-out element 18' disposed essentially within center plane 107 of space 108 between scanning devices 106. In this case, the output signals from position sensors 105 and 104 are essentially equal to each other, thereby indicating that close-out member 18' is disposed sufficiently close to plane 107 that no corrective action need be taken upon the effective length of belt 33.

In FIG. 9, however, close-out member 18' is disposed sufficiently far to the right of center plane 107 that the output of sensor 104 significantly exceeds the output of sensor 105. Under these circumstances, the difference in signals between sensors 104 and 105 is indicative of the fact that the truss section of which close-out member 18' forms a part (and of the adjacent truss sections within strip 21) is somewhat shorter than the optimum desired length of a truss section by an amount which is within the amount of tolerance acceptable in truss fabrication station 20, but which is sufficiently close to the limit of tolerance acceptable that a correction in the effective length of belt 33 should be accomplished, to increase the effective length of a truss section. In his situation, control circuit 83 is effective to generate a signal, via connection 52, to belt length adjustment station 40 effective to operate solenoid 76, thereby to increase the spacing between axes 62.

FIG. 10, on the other hand, illustrates the reverse of the situation shown in FIG. 9. In this case, the signal from sensor 105 significantly exceeds the value of the signal from sensor 104. Circuit 83, therefore, is effective to generate a control signal which is applied to solenoid 75 to produce operation of variable length connection mechanism 73 to reduce the distance between belt axes 62.

For example, it may be desired to control the length of each truss section at 10 feet plus or minus 0.0025 inch. Under such circumstances, sensors 105 and 104 may be arranged to produce belt lengthening or shortening output signals from circuit 83 if the close-out members 18 at the end of every fifth truss section in strip 21 deviates by more than 0.010 inch from the position which that close-out member would occupy (a position within center plane 107) if all five truss sections within the group of five truss sections were precisely 10 feet in length. A deviation of 0.010 inch in the position of close-out member 18' from precise alignment in center plane 107 means that the five truss sections in the group of five represented by closeout member 18' are 0.0020 inch shorter than the desired length of 10 feet 0.000 inches. Thus, as indicated in FIG. 9, sensors 104 and 105 are arranged to produce a belt lengthening control signal from circuit 83 when the difference between the signals generated at sensors 104 and 105 shows that close-out member 18' is disposed 0.010 inch or more out of precise alignment with center plane 107 to the right of the center plane. Conversely, if close-out member 18' is disposed 0.010 inch or more to the left out of precise alignment with center plane 107, the value of the signal from sensor 105 sufficiently exceeds the value of the signal from sensor 104 that a belt shortening signal is produced by circuit 83.

Variable length connection mechanism 73 and actuating mechanism 74 are arranged so that, when the actuating mechanism receives a control signal from circuit 83 at either solenoid 75 or solenoid 76, the actuating mechanism is effective, via variable length connection system 73, to produce a 0.010 inch change in the effective length of conveyor belt 33. Preferably, control circuit 83 includes a suitable sampling circuit arranged to produce scanning operation by sensors 104 and 105 of the position of, say, every fifth close-out member 18' relative to center plane 107. In this manner, belt length adjusting station 40 is operated at a maximum interval corresponding to every five truss sections fabricated at station 20, rather than at intervals corresponding to each complete cycle of belt 33 through the fabrication station.

Figure 15:
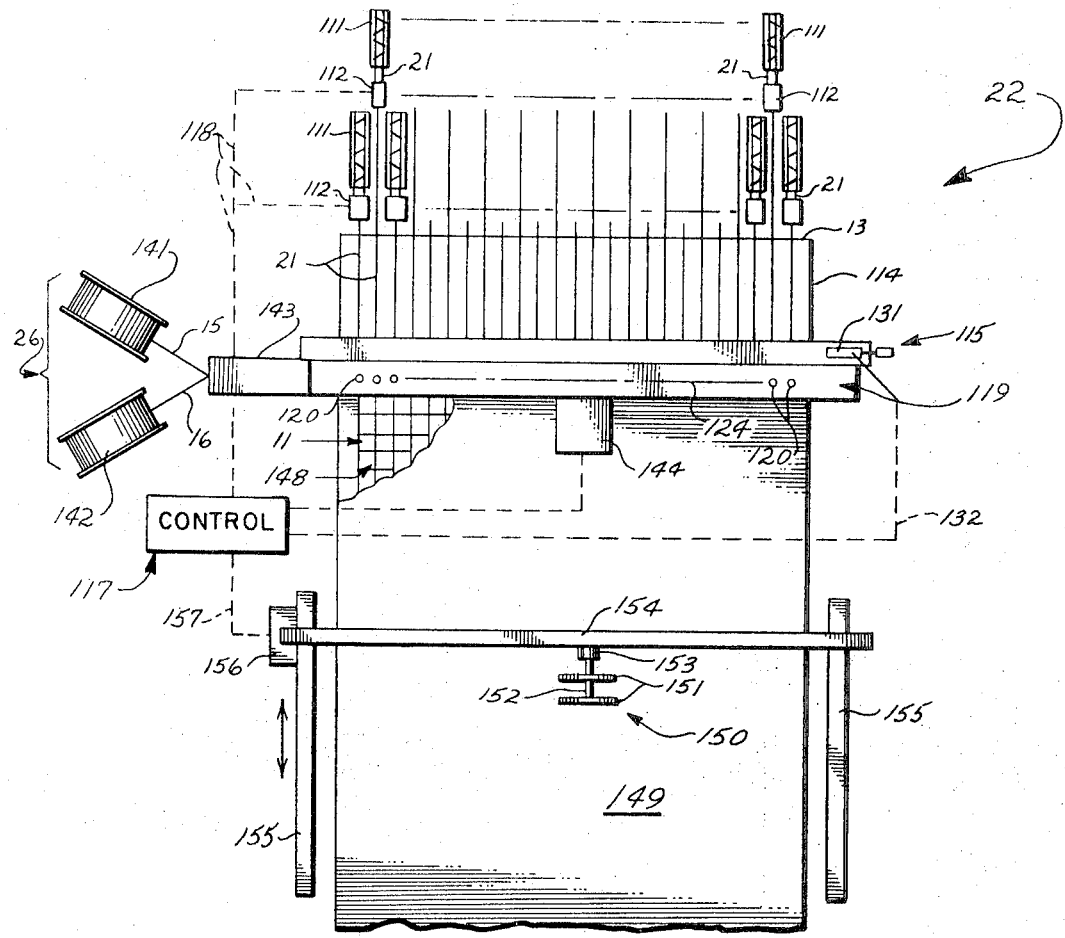
FIG. 15 is a simplified top plan view of a matrix fabrication apparatus according to this invention.

FIG. 15 is a simplified plan view of a presently preferred matrix fabrication station 22. The station includes a position 110 for each of a plurality of coils 111 of truss member strip 21, and a strip twisting and feeding mechanism 112 at each position. If the matrix fabricated at station 22 is organized on the 2 inch cubical module described above and has a width of 4 feet, then twenty-five positions 110 are provided, preferably in two banks of such positions, adjacent the rear end 113 of a foundation 114 of a matrix fabrication apparatus 115. Positions 110 are spaced on 2 inch centers across the width of foundation 114. Each mechanism 112 is arranged to receive truss section strip 21 from an adjacent coil thereof, to twist the strip 90° and to feed the strip intermittently from the coil toward foundation 114 and into a corresponding strip guide 116, shown best in FIG. 17. The operation of the feeding elements of mechanisms 112 is regulated by a control device 117 to which mechanisms 112 are connected, as represented by broken lines 118. Guides 116 extend from adjacent the rear edge of the foundation 114 to forward ends disposed below a welding electrode assembly 119 which extends transversely across foundation 114. Welding electrode assembly 119 defines a plurality of welding stations 120 corresponding in number to the number of positions 110 for strip coils 111. Thus, in a presently preferred matrix fabrication apparatus, twenty-five welding stations are disposed along the length of welding electrode assembly 119.

Each welding station 120 includes upper and lower electrodes 121 and 122, i.e., first and second electrodes, which are coaxially aligned with each other and are movable toward and away from each other along their common axis 123. The electrode axes 123 for the several weld stations 120 are disposed parallel to each other in a common plane 124 disposed transversely of foundation 114 perpendicular to the length of strip guides 116. Strip guides 116 are aligned to guide truss section strips 21 toward the welding station 120 in parallel planes perpendicular to plane 124 in such manner that the plane of movement of each truss section strip includes the electrode axis 123 of the corresponding weld station 120. Electrodes 121 and 122 are driven toward and away from each other by suitable apparatus which is conventional, preferably pneumatic apparatus or the like. Each welding station 120 also includes a central electrode 125.

Figure 16:
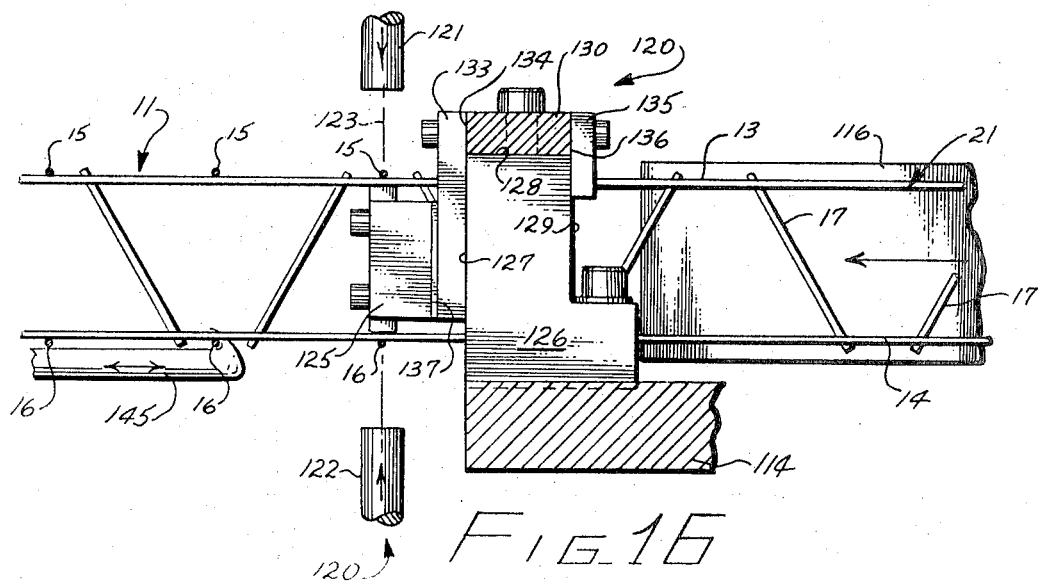
FIG. 16 is an enlarged cross-sectional elevation view at a welding station within the matrix fabrication apparatus shown in FIG. 15.

As shown in FIG. 16, a mounting block 126 is provided for each welding station 120, and is secured to foundation 114 to the rear of the common plane of electrode axes 123. Each mounting block has forward, top and rear surface 127, 128 and 129, respectively. The upper faces 128 of the several mounting blocks are coplanar and are engaged with the bottom face of a transverse shuttle bar 130 which is aligned with the length of welding electrode assembly 119, and which is reciprocated transversely of foundation 114 by a reciprocating mechanism 131. The operation of reciprocating mechanism 131 is regulated by control mechanism 117 via connection 132 shown in broken lines in FIG. 15. The limits of reciprocatory movement of shuttle bar 130 correspond to the movement of central electrodes 125 between their operative welding and retracted positions. A central electrode mounting plate 133 is also provided for each welding station 120 and is connected to the front face 134 of shuttle bar 130 at its upper end to cooperate with the front face 127 of the corresponding mounting block 126 below the shuttle bar to provide a positioning function for the shuttle bar relative to the corresponding mounting block. The lower end of each mounting plate 133 is disposed at an elevation between the positions of truss runners 13 and 14 as strip 21 is fed through the common plane of electrodes 121 and 122. Shuttle bar 130 is further guided in its reciprocatory motion relative to the several mounting blocks 126 by a retainer member 135 carried by the rear face 136 of the shuttle bar to cooperate with the rear face 129 of the adjacent mounting block. Each central electrode 125 is connected to the lower portion of its mounting plate 133 via an electrically insulative element 137 so that each central electrode 125 is conductively isolated from its mounting plate.

Figure 17:
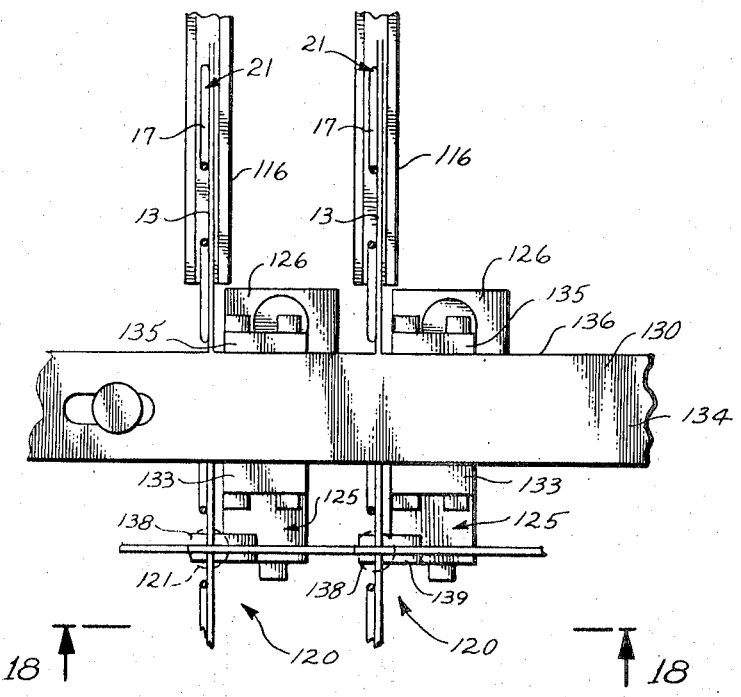
FIG. 17 is an enlarged top plan view of certain of the components of the matrix fabrication apparatus at adjacent welding stations within such apparatus.
Figure 19:
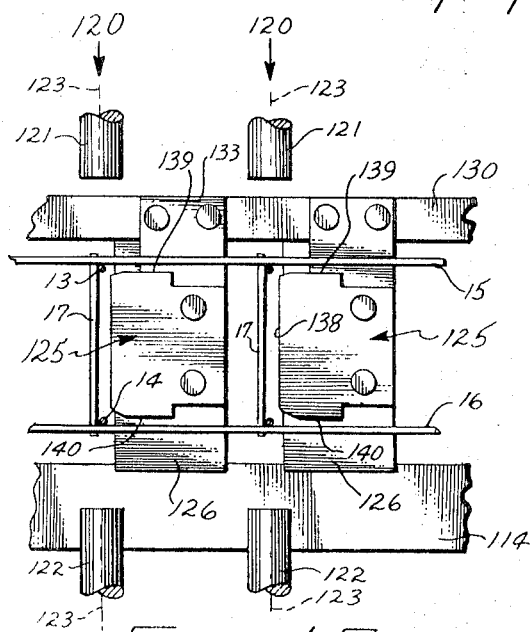
FIG. 19 is a view similar to that of FIG. 18 showing the apparatus of FIG. 18 in a different state.
Figure 18:
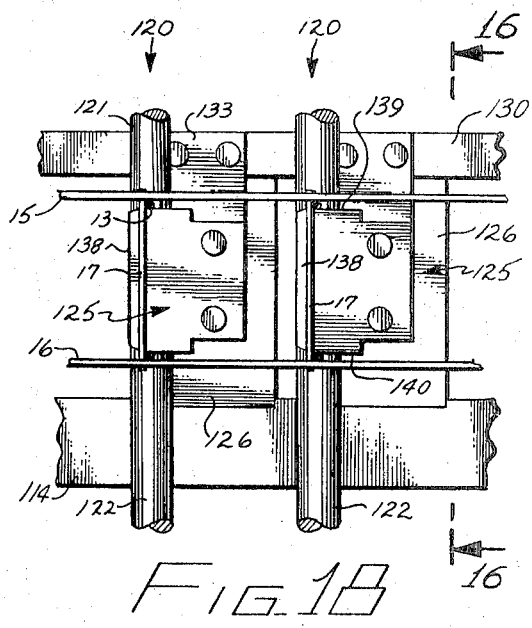
FIG. 18 is an elevation view taken along line 18 in FIG. 17.

As shown best in FIGS. 17, 18 and 19, each central electrode has a lateral welding flange 138 which is disposed in electrode plane 124. Each flange has upper and lower surfaces 139 and 140, respectively, which are spaced apart a distance equal to the distance between the opposing surfaces of truss runners 13 and 14 in a truss section strip 21. The intersection of surfaces 139 and 140 with the adjacent vertical face of flange 138 preferably is somewhat chamfered or rounded, as shown in FIGS. 18 and 19. The thickness of welding flange 138 in a direction perpendicular to electrode plane 124 is substantially less than the distance along a truss runner between the converging ends of adjacent strut members 17.

The several central electrodes 125 are reciprocable in their common plane which coincides with common plane 124 of upper and lower electrodes 121 and 122, respectively, in response to the reciprocation of shuttle bar 130.

FIG. 19 shows central electrodes 125 in their retracted positions wherein welding flanges 138 are disposed to the side of the channels defined by guides 116 and through which truss section strips 21 are directed toward welding stations 120. When the central electrodes are disposed in their welding positions, as shown in FIG. 18, welding flanges 138 are disposed to traverse the axis 123 of the adjacent upper and lower electrodes in plane 124, and also to be disposed across the path of movement of truss section strips 21. In their welding positions, the upper and lower surfaces 139 and 140, respectively, of the central electrodes are engaged with the lower and upper surfaces of truss runners 13 and 14 of strips 21. Preferably, the central electrodes are moved from their retracted position to their welding position before upper and lower electrodes 121 and 122 are moved toward each other along their common axes. In their welding positions, central electrodes 125 serve as conductive anvils for the upper and lower electrodes, respectively, so that the upper and lower electrodes may forcibly urge pieces of transverse member wire stock (inserted into position in welding plane 124 across the top and bottom of the several truss section strips) into forcible engagement with the upper and lower truss runners in the several strips 21 without producing significant deflection of the truss runners. After the upper and lower electrodes have been moved toward each other into engagement with the material to be welded, a welding pulse of suitable duration and intensity is passed through the upper and lower electrodes at each station via the central electrode of that station. Thereafter, the upper, lower and central electrodes at each station are moved back to their retracted positions, as shown in FIG. 19, to enable truss section strips 21 to be advanced (2 inches in the case of the presently preferred matrix described above), following which the above-described electrode movement sequence is again initiated.

An examination of FIGS. 16, 17, 18 and 19 will show that it is necessary that central electrodes 125 be movable to retracted positions spaced completely between adjacent truss section strips. This condition is necessary because otherwise the presence of the central electrodes transversely of the plane of each truss section strip would prevent the truss section strip from being advanced through electrode plane 124 for the next welding operation. This is so since the upper and lower truss runners are interconnected by strut members 17 between each location along the truss section at which a transverse member 15 or 16 is secured to the truss section.

As shown best in FIG. 15, the matrix fabrication apparatus includes a transverse stock material supply location 26 at which a pair of coils 141 and 142 of wire are disposed adjacent a wire straightening, feeding and cutting mechanism 143 which forms the equivalent of transverse stock uncoiling station 27 shown in FIG. 2. Strands of wire of the size appropriate to define matrix transverse members 15 and 16 are led from coils 141 and 142, respectively, to straightening, feeding and cutting mechanism 143. The wires are guided from mechanism 143 toward welding electrode assembly 119 in welding electrode plane 124 at parallel positions spaced from each other by a distance slightly greater than the distance between aligned transverse members in matrix 11. The operation of mechanism 143 is regulated by control mechanism 117, shown in FIG. 15, in proper synchronism with the other components of truss fabrication station 22 to produce feeding of straight pieces of wire stock material of the proper length transversely between upper and lower electrodes 121 and 122 across the top of truss section strips 21.

Matrix fabrication apparatus 115 also includes a matrix advancing mechanism 144 which preferably is mounted to foundation 114 to cooperate with the lower portion of the welded matrix as the matrix emerges from welding electrode assembly 119. Advancing mechanism 144 preferably includes a reciprocal claw member 145 (see FIG. 16) arranged to engage lower transverse members 16 in the welded matrix. The claw member has a stroke equal to the distance by which adjacent transverse members 16 are spaced in matrix 11. Claw member 145 includes a hook projection 146 which is arranged to ride past transverse member 16 during extension of the claw member toward the rear of foundation 114, but to engage a transverse member during retraction of the claw member away from the rear of the foundation.

In the operation of the matrix fabrication apparatus, truss section strips 21 are fed from positions 110 through feeding and twisting mechanisms 112 into corresponding guides 116 until the lead ends of strips 21 (commencing with a close-out member) are all properly positioned relative to their corresponding welding stations 120; such disposition of the several strips 21 produces the desired positional alignment between corresponding locations of the several strips. Wire straightening, feeding and cutting mechanism 143 is then operated to cause two lengths of straight wire stock material to be fed into position in electrode plane 124 across the upper and lower truss runners of the several truss section strips. Welding electrode assembly 119 is then operated to move central electrodes 125 into position across electrode axes 123, as shown in FIG. 18, following which upper and lower electrodes 121 and 122 are simultaneously engaged with transverse members 15 and 16. Suitable welding pulses are passed between the upper and lower electrodes at each station via the central electrode at the station to weld the first transverse members to the truss section strips at aligned locations above and below the strips. The operation of welding electrode assembly 119 is then continued to retract the upper and lower electrodes away from the respective strips and to retract the central electrodes to their retracted positions, shown in FIG. 19. Matrix advancing mechanism 144 is then operated in response to control mechanism 117 to cause claw member 145 to advance into position adjacent the common plane of the upper and lower electrodes to engage the lower transverse member which has just been welded to the lead end of the several truss section strips. Retraction of claw member 145 is synchronized by control mechanism 117 with the operation of feeding and twisting mechanisms 112 to cause an additional increment of all of truss section strips 21 to be advanced through guides 116 toward welding electrode assembly 119; such operation results in the strips being both pulled and pushed through guides 116. Straightening, feeding and cutting mechanism 143 is then again operated to feed two additional lengths of wire stock material into position above and below the truss section strips for welding of the next pair of transverse members to the strips. Thereafter, the operation of matrix fabrication apparatus 115 proceeds automatically by repetition of the sequence described above, and such operation continues automatically until the supply of truss section strips 21 on the several coils 111 is depleted. Filled coils 111 are then placed in the appropriate locations at positions 110, and the apparatus is reloaded and again placed into automatic operation in the manner described above.

As is apparent from the preceding description, each strip 21 of truss sections constitutes a plurality of serially connected truss sections 19. Accordingly, automatic operation of matrix fabrication apparatus 115 produces a continuous strip 149 of serially connected matrices 11. The matrix strip may be fed directly to core formation station 28 (shown in FIG. 2) where individual matrix units are cut from the matrix strip after formation of core 12 within the matrix strip. However, to facilitate formation of the insulative core 12 in the matrix at a location remote from matrix fabrication station 22, matrix fabriation apparatus 115 includes apparatus for cutting the continuous matrix strip 148 into individual matrix units.

As matrix strip 148 emerges from welding electrode assembly 119, the strip passes over a run-out area 149 defined by foundation 114. A matrix strip cutting assembly 150 including a pair of parallel abrasive cutting discs 151 mounted coaxially on a rotatable drive shaft 152 extending from a suitable motor housing 153 carried on a track 154. Track 154 is disposed transversely of run-out area 149 and is supported at each of its opposite ends on a corresponding one of a pair of tracks 155 disposed parallel to the length of run-out area 149, i.e., parallel to the direction of advance of matrix strip 148. Track 154 is driven along tracks 155 by a suitable drive mechanism 156 regulated by control mechanism 117 via connection 157. The thickness of abrasive cutting discs 151 and their spacing along drive shaft 152 corresponds to the distance between adjacent close-out members 18 encountered in truss section strip 21. That is, the width of cut produced by discs 151 is somewhat less than the distance between adjacent close-out members 18 in strip 21, thereby to produce matrix 11 as shown in FIG. 1.

In view of the foregoing description of the operations occurring at welding electrode assembly 119, it is apparent that matrix strip 148 advances in a discontinuous manner across run-out area 149. Cutting discs 151 are advanced continuously across the width of run-out area 149 along track 154. The movement of track 154, however, along tracks 155 is produced in a discontinuous manner synchronized with the discontinuous advance of matrix strip 148. In this manner, a continuous cut across the width of matrix strip 148 may be produced even though the movement of the strip across run-out area 149 occurs intermittently.

It has been determined by experience that it is important that the force applied between transverse members 15 and 16 and truss runners 13 and 14 during the process of welding the transverse members to the truss runners be applied in a direction perpendicular to the opposite major surfaces of matrix 11. It has been found that when welding force is applied to the transverse members and truss runners in a direction other than a direction normal to the matrix major surfaces, considerable warpage of the matrix is produced. Such warpage is believed to be a result of thermally induced stresses generated in the matrix as it emerges from welding electrode assembly 119. It has been found that where the transverse members in one major surface of the matrix are aligned vertically with the transverse members in the other major surface of the matrix, that where these aligned transverse members are welded simultaneously to the strut sections within the matrix, and that where the forces associated with the welding operation are applied along lines normal to the major surfaces of the matrix, a perfectly flat matrix emerges from the welding electrode assembly. The presence of any significant warpage in the matrix as it emerges from the welding electrode assembly is highly disadvantageous. Such warpage can be corrected only by placing the finished matrix in a straightening press which bends the elements of the matrix to compensate for the warpage induced by non-optimum welding procedures. Deflection and bending of the various elements of the finished matrix may result in many of the welds of the matrix being severed during the warpage correction process. Obviously, in view of the use of matrix 11 in a prefabricated modular building panel, it is apparent that warpage of the matrix in any degree severely restricts the utility of the ultimate building panel. For example, if the building panels are warped, they cannot practically be used to construct an acceptable wall comprised of plural panels wired or otherwise secured together and covered by a coating of plaster or the like.

In view of the fact that it is highly desirable that welding force be applied to the elements to be welded at welding assembly 119 along lines perpendicular to the major surfaces of the resulting matrix, it follows that central electrodes 125 must be provided in such a manner so as to be movable to positions directly below the truss runners within the plane of truss section strip 21 to provide support for the truss runners during the welding process. Where the welding process is performed by application of welding force perpendicular to the planes of the major surfaces of the matrix, the thermal stresses induced at the connection of each transverse member with its adjacent truss runner balance and counteract the thermally induced stresses at the point of connection of the opposite transverse member with its struss runner. Accordingly, while matrix 11, as it emerges from welding electrode assembly 119, may contain locked-in stresses, these stresses are in balance with each other. Experience has shown that the application of welding forces along lines oblique to the major surfaces of the matrix results in unacceptable warpage of the matrix strip, and that in many cases the degree of warpage is too great to be corrected by use of a straightening press or the like.

It is apparent that this invention provides effective, efficient, economic and rugged apparatus for automatically or semi-automatically fabricating matrix subunits and finished matrices either at a common location or at separate locations. Because of the automatic or semi-automatic nature of the above-described apparatus, such apparatus may be operated by semi-skilled or unskilled personnel. The matrix fabrication process is particularly suited to the manufacture of truss units on a plurality of machines, the product of which may be supplied interchangeably to one or more matrix fabrication apparatus 115 without adverse effect upon the efficiency of the fabrication apparatus. The product produced by operation of truss fabrication station 20 emerges from the station in a compact, easily transportable form, i.e., coils 111. It is apparent, therefore, that the truss section fabrication operation may be carried out at a location widely removed from the location at which the ultimate matrices are fabricated at matrix fabrication station 22. Coils 111 of truss section strip 21 may be transported economically from the truss fabrication station to the matrix fabrication station, together with coils 141 and 142 of stock material for transverse members 15 and 16.

Workers skilled in the art and technology to which this invention pertains will readily appreciate that the procedures and structures described above may be altered or modified without departing from the teachings made by the foregoing description. Also, in the foregoing description, specific procedures amd structural arrangements and the like have been presented with reference to presently preferred embodiments of the invention for the purposes of illustration and example, and not as an exhaustive and comprehensive exposition of all the forms and ramifications which this invention may possess. Accordingly, the foregoing description should not be considered as limiting the scope of this invention.

What is claimed is:

1. In welding apparatus for fabricating a welded wire, three-dimensional rectilinear matrix having strut members traversing the interior of the matrix between opposite major surfaces of the matrix, the apparatus comprising coaxially aligned first and second electrodes, means mounted the first and second electrodes for movement along their common axis toward each other into a welding position thereof and away from each other into a retracted position thereof, and a central electrode, the improvement comprising, in combination, means mounting the central electrode for movement along a first path substantially normal to said axis within the matrix independently of movement of the matrix along the first path relative to the first and second electrode between a welding position in which the central electrode intercepts said axis to serve as a conductive anvil for the first and second electrodes and a retracted position spaced from said axis, the retracted position of the electrodes accommodating movement along a second path substantially normal to the first path of material welded and to be welded out of and into place between the first and second electrodes across said axis, such movement of material at times including movement of at least one of the strut members across said axis through the welding position of the central electrode, and means coupled to the central electrode operable for moving the central electrode along said first path between the welding and retracted positions of the central electrode.

2. Apparatus according to claim 1 wherein the central electrode is arranged to serve as a conductive anvil for the first and second electrodes simultaneously.

3. Apparatus according to claim 1 comprising a first, second and central electrode at each of a plurality of spaced welding stations within the apparatus, the first and second electrodes at all stations being disposed parallel to a common plane, means operative upon first matrix components to be welded at all of said stations for moving said first components at each station along the corresponding second path concurrently with movement of said components at the other stations, and means coordinating operation of the means for moving the several central electrodes so that the central electrodes are moved together between their welding and retracted positions along said first paths substantially parallel to said plane, the second paths for the several stations being substantially normal to said plane.

4. Apparatus according to claim 3 wherein the central electrodes at the several stations are movable parallel to said common plane.

5. Apparatus according to claim 3 wherein said first components to be welded comprises a matrix subunit for each welding station, the subunits adjacent their respective welding stations being disposed in spaced parallel secondary planes substantially normal to said common plane and substantially parallel to the axes of said first and second electrodes at the respective welding stations, each subunit comprising a pair of spaced wires extending along the length of the subunit along opposite margins thereof and a plurality of matrix strut members connected between said wires at spaced locations along the subunit, and wherein the central electrode at each station, when in its welding position, traverses the corresponding second plane.

6. Apparatus according to claim 5 including means for moving second matrix components to be welded along a line substantially parallel to said common plane into place between the first and second electrodes at each welding station, for affixation to the matrix subunits to interconnect the subunits to define the matrix.

7. Apparatus according to claim 3 wherein the common axes of the first and second electrodes at the welding stations are parallel to each other.

8. Apparatus according to claim 7 wherein the first and second electrodes are disposed in said common plane.

9. Apparatus according to claim 3 including means for driving the first and second electrodes at each welding station toward and away from each other when the corresponding central electrode is in its welding position, means for moving second components of the matrix in said common plane into position to be welded between the first and second electrodes at each station, and means for operating the component moving means associated with each welding station when the corresponding central electrode is in its retracted position.

10. Apparatus according to claim 9 wherein said driving means for the several welding stations are operative in tandem and said first component moving means are common to the several welding stations.

11. Apparatus according to claim 10 wherein the matrix is comprised of a plurality of essentially identical truss sections each having a pair of parallel spaced runner members extending the length thereof and a plurality of strut members interconnected between the runner members at regularly spaced locations along the truss section, and the matrix is further comprised of a plurality of regularly spaced members each disposed parallel to the others thereof transversely of the truss sections and connected to a runner member of each of the truss sections at correspnding locations spaced regularly along each said transverse member, the transverse members comprising said first component of the matrix and the truss sections comprising said additional components of the matrix.

12. In apparatus for the fabrication of a welded wire, three-dimensional rectilinear matrix having major dimensions in opposite major surfaces of the matrix and a minor dimension between the major surfaces, the matrix being comprised of a plurality of spaced matrix subunits extending in respective planes substantially parallel to one of the matrix major dimensions and of a plurality of spaced interconnect members extending substantially parallel to the other matrix major dimension and interconnecting the subunits in each major surface of the matrix, the interconnect members being disposed in pairs in which the members thereof are disposed in a plane substantially perpendicular to the matrix major surfaces, each subunit having longitudinal elements spaced in the subunit plane a distance essentially equal to the matrix minor dimension and a plurality of strut members interconnected in the subunit between the longitudinal elements at spaced locations along the subunit, the improvement comprising means for applying welding force between and interconnect member and a subunit longitudinal element along a line normal to the matrix major surface associated with said member and element, said means including an outer electrode disposed outside the matrix major surfaces, and an inner electrode disposed between the matrix major surfaces, the inner electrode having a welding position aligned with the outer electrode and traversing the corresponding subunit plane, and means for moving the inner electrode in the matrix relative to the matrix out of alignment with the outer electrode and out of the subunit plane independently of movement between the matrix and the outer electrode to permit the matrix and the electrodes to be moved relative to each other in a work advancing manner.

13. Apparatus according to claim 12 wherein the welding force applying means includes coaxially aligned opposed movable upper and lower electrodes, one of the upper and lower electrodes comprising the aforesaid outer electrode, means for moving the upper and lower electrodes along paths normal to the matrix major surfaces between retracted positions thereof spaced a distance greater than the matrix minor dimension and welding positions in which each of said electrodes forceably engages an interconnect member between it and a matrix subunit longitudinal element when a matrix interconnect member is disposed between said electrode and the matrix subunit, a central electrode comprising the aforesaid inner electrode and sized to be disposed between and clear of adjacent matrix subunits for work-advancing movement of the adjacent subunits relative to the central electrode, and the aforesaid means for moving the inner electrode includes means for moving the center electrode within the matrix while the matrix is stationary relative to the inner and outer electrodes between a retracted position in which the center electrode is disposed wholly between adjacent matrix subunits out of coaxial alignment with the upper and lower electrodes to thereafter accommodate said work-advancing movement and a welding position within a matrix subunit in which the central electrode is disposed for cooperation coaxially with the upper and lower electrodes to define a conductive path from at least one of the upper and lower electrodes through an interconnect member engaged by said one electrode and through a subunit longitudinal element to the central electrode.

14. Apparatus according to claim 13 wherein the central electrode is configured to define, in the welding position thereof, a conductive path between the upper and lower electrodes via the longitudinal elements of a subunit within which the central electrode is disposed and via an interconnect member engaged with each said longitudinal element.

15. Apparatus for fabricating a strip of serially connected identical constructions in which corresponding locations in a predetermined number of constructions are spaced a predetermined distance apart along the strip, the apparatus comprising a conveyor belt loop the length of which defines said predetermined distance, means for driving the belt continuously along a desired path, means carried by the belt for receiving said components of a construction and for supporting received components in predefined positions relative to each other, means cooperating with the belt along said path for connecting together in said predefined positions components supported on the belt thereby to define the constructions and the strip thereof, and means operative upon a selected point on the belt during driving of the belt for altering the effective length of the belt to maintain said predetermined distance.

16. Apparatus according to claim 15 including means for generating a signal when the distance along the strip between corresponding locations of a predetermined number of constructions differs by a selected amount from the predetermined distance, and means responsive to the signal for operating the belt length altering means to reduce the difference.

17. Apparatus according to claim 16 wherein the belt length altering means includes means for interconnecting opposite ends of the belt to define the belt loop.

18. Apparatus according to claim 15 wherein the means for connecting together components supported on the belt comprises means for welding said components together, said components being electrically conductive, and wherein the component supporting means carried by the belt include means defining a portion of a conductive path within the belt along which welding current flows during welding of said components.

19. Apparatus according to claim 18 wherein the construction components comprise a pair of spaced parallel members extending the length of the construction along opposite margins thereof, the marginal members of each construction being common to the adjacent constructions in the strip, and a plurality of transverse members each extending between and connected to the opposite marginal members at intervals along the strip, and wherein the means for receiving and supporting the construction components comprises a corresponding plurality of electrically non-conductive carrier blocks for receiving and positioning first the marginal members and a corresponding transverse member with one of the transverse member or the marginal members disposed at least partially above the top of the block, each block including means defining a conductive path through the block between the location of engagement of the transverse member with one marginal member and the location of engagement of the transverse member with the other marginal member.

20. Apparatus according to claim 19 wherein the belt comprises a length of link chain to which the chain blocks are mounted.

21. Welding apparatus for fabricating a welded wire three-dimensional rectilinear matrix comprised of a plurality of essentially identical truss sections, each truss section having a pair of parallel runner members extending the length thereof and a plurality of strut members interconnected between the runner members at regularly spaced locations along the truss section, the matrix being further comprised of a plurality of regularly spaced members each disposed parallel to the others thereof transversely of the truss sections substantially normal to the planes of the truss sections and connected to a runner member of each truss section at corresponding locations regularly spaced along each said transverse member, whereby corresponding truss section runner members and transverse members connected thereto define opposite major surfaces of the matrix which are spaced from each other a distance corresponding to the spacing between the runner members of each truss section, and whereby the strut members of the several truss sections traverse the interior of the matrix between the opposite major surfaces thereof, said welding apparatus including apparatus for welding the elements of the truss sections together comprising a conveyor belt loop for receiving and supporting the truss runners and the strut members, in predetermined positions for and during welding means for driving the belt loop, and means operative at a selected location on the belt loop during driving of the belt loop for altering the effective overall length of the belt loop, said welding apparatus also including apparatus for welding the transverse members to the truss sections comprising coaxially aligned first and second electrodes reciprocal toward and away from each other along their common axis, and a central electrode mounted for movement between a welding position in which the central electrode intercepts said axis to serve as a conductive anvil for the first and second electrodes and a retracted position spaced from said axis to accommodate movement of said truss sections and the transverse members into and out of place between the first and second electrodes across said axis 22. Apparatus according to claim 21 wherein the truss section welding apparatus is operative to define said truss sections as a strip of serially connected truss sections, means for generating a signal when the length of a predetermined number of truss sections in said strip differs by a selected amount from a preset standard length thereof, and means responsive to the signal for operating the belt loop length altering means.

23. Resistance welding apparatus comprising, coaxially aligned first and second electrodes, means mounting the first and second electrodes for movement along their common axis toward each other into a welding position thereof and away from each other into a retracted position thereof, and a central electrode, means mounting the central electrode for movement along a first path substantially normal to said axis of the first and second electrodes between a welding position in which the central electrode intercepts said axis to serve as a conductive anvil for the first and second electrodes and a retracted position spaced from said axis, the retracted position of the electrodes accommodating movement along a second path substantially normal to the first path of material welded and to be welded out of and into place between the first and second electrodes across said axis, such movement of material at times including movement of an element of the work for the apparatus across said axis through the welding position of the central electrode, and means coupled to the central electrode operable for moving the central electrode along said first path between the welding and retracted positions of the central electrode.

* * * * *